(12) United States Patent
Kim et al.

(10) Patent No.: US 11,537,698 B2
(45) Date of Patent: *Dec. 27, 2022

(54) METHODS AND APPARATUSES FOR ADAPTIVELY UPDATING ENROLLMENT DATABASE FOR USER AUTHENTICATION

(71) Applicant: Samsung Electronics Co., Ltd., Suwon-si (KR)

(72) Inventors: Jungbae Kim, Seoul (KR); Seon Min Rhee, Seoul (KR); Jaejoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 13 days.

This patent is subject to a terminal disclaimer.

(21) Appl. No.: 16/860,267

(22) Filed: Apr. 28, 2020

(65) Prior Publication Data

US 2020/0257786 A1    Aug. 13, 2020

Related U.S. Application Data

(63) Continuation of application No. 15/270,172, filed on Sep. 20, 2016, now Pat. No. 10,769,255.

(30) Foreign Application Priority Data

Nov. 11, 2015  (KR) .................. 10-2015-0158148
Mar. 8, 2016   (KR) .................. 10-2016-0027745

(51) Int. Cl.
     *G06F 21/00* (2013.01)
     *G06F 21/32* (2013.01)
     (Continued)

(52) U.S. Cl.
     CPC .............. *G06F 21/32* (2013.01); *G06F 16/23* (2019.01); *G06F 16/51* (2019.01); *G06F 21/36* (2013.01);
     (Continued)

(58) Field of Classification Search
     CPC .......... G06F 16/51; G06F 21/32; G06F 16/23; G06F 21/45; G07C 9/37; G06K 9/00026;
     (Continued)

(56) References Cited

U.S. PATENT DOCUMENTS 7,646,909 B2   1/2010  Jiang et al.
8,312,291 B2  11/2012  Golic et al.
(Continued)

FOREIGN PATENT DOCUMENTS

EP      2874098 A1     5/2015
JP   2004302644 A    10/2004
(Continued)

OTHER PUBLICATIONS

U.S. Notice of Allowance for corresponding U.S. Appl. No. 15/469,984 dated Apr. 29, 2020.
(Continued)

*Primary Examiner* — Ghazal B Shehni
(74) *Attorney, Agent, or Firm* — Harness, Dickey & Pierce, P.L.C.

(57) ABSTRACT

A method of adaptively updating an enrollment database is disclosed. The method may include extracting a first feature vector from an input image, the input image including a face of a user, determining whether to enroll the input image in the enrollment database based on the first feature vector, second feature vectors of enrollment images and a representative vector, the second feature vectors of the enrollment images being enrolled in the enrollment database, and the representative vector representing the second feature vectors, and enrolling the input image in the enrollment database based on a result of the determining.

15 Claims, 11 Drawing Sheets

(51) Int. Cl.
*G06F 16/23* (2019.01)
*G06F 16/51* (2019.01)
*G06K 9/62* (2022.01)
*G07C 9/37* (2020.01)
*G06V 10/46* (2022.01)
*G06V 40/50* (2022.01)
*G06V 40/70* (2022.01)
*G06V 40/16* (2022.01)
*G06V 40/12* (2022.01)
*G06F 21/45* (2013.01)
*G06F 21/36* (2013.01)
*H04L 9/40* (2022.01)

(52) U.S. Cl.
CPC .......... G06F 21/45 (2013.01); G06K 9/6255 (2013.01); G06V 10/462 (2022.01); G06V 40/1335 (2022.01); G06V 40/1365 (2022.01); G06V 40/161 (2022.01); G06V 40/169 (2022.01); G06V 40/172 (2022.01); G06V 40/174 (2022.01); G06V 40/50 (2022.01); G06V 40/70 (2022.01); G07C 9/37 (2020.01); H04L 63/0861 (2013.01)

(58) Field of Classification Search
CPC .......... G06K 9/00087; G06K 9/00228; G06K 9/00275; G06K 9/00288; G06K 9/00302; G06K 9/00892; G06K 9/00926; G06K 9/4671; G06K 9/6255; H04L 63/0861
See application file for complete search history.

(56) References Cited

U.S. PATENT DOCUMENTS

| | | | |
|---|---|---|---|
| 9,530,052 B1 | 12/2016 | Pillai et al. | |
| 2007/0047811 A1* | 3/2007 | Itoh | G06T 7/254 |
| | | | 382/173 |
| 2011/0135165 A1 | 6/2011 | Wechsler et al. | |
| 2012/0294496 A1 | 11/2012 | Nakamoto | |
| 2013/0051632 A1 | 2/2013 | Tsai et al. | |
| 2013/0318351 A1 | 11/2013 | Hirano et al. | |
| 2013/0343616 A1 | 12/2013 | Forero et al. | |
| 2014/0185794 A1 | 7/2014 | Yasuda et al. | |
| 2015/0092996 A1* | 4/2015 | Tian | G06K 9/00926 |
| | | | 382/118 |
| 2016/0063235 A1* | 3/2016 | Tussy | H04W 12/06 |
| | | | 726/6 |
| 2017/0132458 A1* | 5/2017 | Short | G06K 9/00255 |

FOREIGN PATENT DOCUMENTS

| | | |
|---|---|---|
| JP | 2009258990 A | 11/2009 |
| JP | 2012-194605 A | 10/2012 |
| JP | 2013077068 A | 4/2013 |
| JP | 2014002506 A | 1/2014 |
| JP | 2015-69574 A | 4/2015 |
| KR | 20080097798 A | 11/2008 |
| KR | 101180471 B1 | 9/2012 |
| WO | WO-2011140605 A1 | 11/2011 |

OTHER PUBLICATIONS

U.S. Notice of Allowance for corresponding U.S. Appl. No. 15/270,172 dated May 7, 2020.
Extended European Search Report dated Mar. 28, 2017.
U.S. Office Action for corresponding U.S. Appl. No. 15/469,984 dated Jan. 10, 2019.
U.S. Office Action for corresponding U.S. Appl. No. 15/469,984 dated May 14, 2019.
U.S. Office Action for corresponding U.S. Appl. No. 15/469,984 dated Nov. 5, 2019.
U.S. Office Action for corresponding U.S. Appl. No. 15/469,984 dated Feb. 20, 2020.
Japanese Office Action dated Mar. 8, 2022 issued in corresponding Japanese Patent Application No. 2020-195840. English translation has been provided.

* cited by examiner

|  | $x_1$ | $x_2$ | $x_3$ | $x_4$ | $x_5$ | $x_6$ | $x_7$ | $x_8$ | $x_9$ | $x_{10}$ |
|---|---|---|---|---|---|---|---|---|---|---|
| $x_1$ | 0 | 1.554 | 1.277 | 0.811 | 1.273 | 1.376 | 1.466 | 1.425 | 1.469 | 1.305 |
| $x_2$ | 1.554 | 0 | 1.519 | 1.409 | 1.391 | 1.745 | 1.646 | 1.672 | 1.775 | 1.791 |
| $x_3$ | 1.277 | 1.519 | 0 | 1.325 | 1.126 | 1.219 | 1.489 | 1.298 | 1.630 | 1.302 |
| $x_4$ | 0.811 | 1.409 | 1.325 | 0 | 1.247 | 1.537 | 1.617 | 1.532 | 1.476 | 1.532 |
| $x_5$ | 1.273 | 1.391 | 1.126 | 1.247 | 0 | 1.483 | 1.565 | 1.482 | 1.560 | 1.486 |
| $x_6$ | 1.376 | 1.745 | 1.219 | 1.537 | 1.483 | 0 | 1.226 | 0.921 | 1.522 | 0.938 |
| $x_7$ | 1.466 | 1.646 | 1.489 | 1.617 | 1.565 | 1.226 | 0 | 1.291 | 1.613 | 1.180 |
| $x_8$ | 1.425 | 1.672 | 1.298 | 1.532 | 1.482 | 0.921 | 1.291 | 0 | 1.520 | 0.951 |
| $x_9$ | 1.469 | 1.775 | 1.630 | 1.476 | 1.560 | 1.522 | 1.613 | 1.520 | 0 | 1.614 |
| $x_{10}$ | 1.305 | 1.791 | 1.302 | 1.532 | 1.486 | 0.938 | 1.180 | 0.951 | 1.614 | 0 |
| Distance average | 1.196 | 1.450 | 1.218 | 1.249 | 1.261 | 1.197 | 1.309 | 1.209 | 1.418 | 1.210 |

|  | $x_1$ | $x_2$ | $x_3$ | $x_4$ | $x_5$ | $x_6$ | $x_7$ | $x_8$ | $x_9$ | $x_{10}$ |
|---|---|---|---|---|---|---|---|---|---|---|
| $x_1$ | 0 | 1.967 | 1.703 | 1.737 | 1.583 | 1.665 | 1.817 | 1.781 | 1.778 | 1.649 |
| $x_2$ | 1.967 | 0 | 1.837 | 1.409 | 1.795 | 2.127 | 2.012 | 2.005 | 1.775 | 1.927 |
| $x_3$ | 1.703 | 1.837 | 0 | 1.626 | 1.849 | 1.769 | 1.660 | 1.593 | 1.622 | 1.792 |
| $x_4$ | 1.737 | 1.409 | 1.626 | 0 | 1.833 | 2.004 | 1.660 | 1.905 | 1.476 | 1.832 |
| $x_5$ | 1.583 | 1.795 | 1.849 | 1.833 | 0 | 1.949 | 2.041 | 1.998 | 1.842 | 1.507 |
| $x_6$ | 1.665 | 2.127 | 1.769 | 2.004 | 1.949 | 0 | 1.661 | 1.622 | 1.758 | 1.835 |
| $x_7$ | 1.817 | 2.012 | 1.660 | 1.660 | 2.041 | 1.661 | 0 | 1.333 | 1.648 | 1.747 |
| $x_8$ | 1.781 | 2.005 | 1.593 | 1.905 | 1.998 | 1.622 | 1.333 | 0 | 1.749 | 1.838 |
| $x_9$ | 1.778 | 1.775 | 1.622 | 1.476 | 1.842 | 1.758 | 1.648 | 1.749 | 0 | 1.758 |
| $x_{10}$ | 1.649 | 1.927 | 1.792 | 1.832 | 1.507 | 1.835 | 1.747 | 1.838 | 1.758 | 0 |
| Distance average | 1.568 | 1.685 | 1.545 | 1.548 | 1.640 | 1.639 | 1.558 | 1.582 | 1.541 | 1.589 |

METHODS AND APPARATUSES FOR ADAPTIVELY UPDATING ENROLLMENT DATABASE FOR USER AUTHENTICATION

CROSS-REFERENCE TO RELATED APPLICATION

This application is a continuation application of and claims priority under 35 U.S.C. § 120/121 to U.S. application Ser. No. 15/270,172 filed Sep. 20, 2016, which claims priority under 35 U.S.C. § 119 to Korean Patent Application No. 10-2015-0158148, filed on Nov. 11, 2015, and Korean Patent Application No. 10-2016-0027745, filed on Mar. 8, 2016, at the Korean Intellectual Property Office, the entire contents of each of which are incorporated herein by reference in their entirety.

BACKGROUND

1. Field

At least one example embodiment relates to an adaptive updating methods and/or apparatuses of an enrollment database for user authentication.

2. Description of the Related Art

Various mobile devices such as a smartphone and wearable devices may use biometric information of a user, for example, a fingerprint, an iris, a face, voice, and blood vessels in security authentication.

SUMMARY

Since face recognition has a number of change elements according to time, for example, in a makeup style, a hair style, a beard, and a weight of a user, the face recognition may have an issue of performing authentication by comparing an initial enrollment image to a face image to be input.

At least one example embodiment relates to an adaptive updating method of an enrollment database.

According to an example embodiment, a method of adaptively updating an enrollment database includes extracting a first feature vector from an input image, the input image including a face of a user, determining whether to enroll the input image in the enrollment database based on the first feature vector, second feature vectors of enrollment images and a representative vector, the second feature vectors of the enrollment images being enrolled in the enrollment database, and the representative vector representing the second feature vectors, and enrolling the input image in the enrollment database based on a result of the determining.

Example embodiments provide that the determining whether to enroll the input image may include at least one of determining whether the input image is an outlier based on the first feature vector, the second feature vectors, and the representative vector, and determining whether a feature range of the enrollment database is increased based on the first feature vector and the second feature vectors.

Example embodiments provide that the determining of whether to enroll the input image comprises determining whether the input image is the outlier based on the first feature vector, the second feature vectors, and the representative vector, the determining whether the input image is the outlier includes, calculating a minimum distance between the first feature vector and the second feature vectors, calculating a representative distance between the first feature vector and the representative vector, and determining that the input image is the outlier based on the minimum distance and the representative distance.

Example embodiments provide that the determining that the input image is the outlier determines that the input image is the outlier based on whether the minimum distance is less than a first threshold and whether the representative distance is less than a second threshold.

Example embodiments provide that the determining whether the feature range of the enrollment database is increased based on the first feature vector and the second feature vectors, the determining whether the feature range of the enrollment database is extended includes, determining an accumulation feature distance corresponding to each vector in a vector set, the vector set including the first feature vector and the second feature vectors, the accumulation feature distance determined based on distances between the corresponding vector and remaining vectors in the vector set, and determining whether the accumulation feature distance corresponding to the first feature vector is greater than at least one of the accumulation feature distances corresponding to the second feature vectors.

Example embodiments provide that the enrolling of the input image in the enrollment database may include replacing one of the enrollment images with the input image if the accumulation feature distance corresponding to the first feature vector is greater than the at least one of the accumulation feature distances corresponding to the second feature vectors.

Example embodiments provide that the replacing the one of the enrollment images replaces the enrollment image corresponding to the second feature vector having a minimum accumulation feature distance among the accumulation feature distances.

Example embodiments provide that the determining whether to enroll the input image may include comparing a number of the enrollment images enrolled in the enrollment database to a maximum enrollment number of the enrollment database.

Example embodiments provide that the enrolling the input image in the enrollment database may include adding the input image to the enrollment database if the number of the enrollment images is less than the maximum enrollment number, and replacing any one of the enrollment images enrolled in the enrollment database with the input image when the number of the enrollment images is equal to the maximum enrollment number.

Example embodiments provide that the adding the input image to the enrollment database adds the input image to the enrollment database if the input image is not an outlier and the number of the enrollment images is less than the maximum enrollment number.

Example embodiments provide that the determining whether to enroll the input image may include authenticating the user based on the first feature vector, the second feature vectors, and the representative vector.

Example embodiments provide that the authenticating the user may include calculating a minimum distance between the first feature vector and the second feature vectors, calculating a representative distance between the first feature vector and the representative vector; and authenticating the user based on the minimum distance, the representative distance and at least one distance threshold.

Example embodiments provide that the determining whether to enroll the input image determines whether to enroll input image in the enrollment database based on the authenticating the user.

Example embodiments provide that the method may further include updating the representative vector by the first feature vector when the input image is enrolled in the enrollment database.

At least one example embodiment relates to an adaptive updating apparatus of an enrollment database.

According to another example embodiment, an adaptive updating apparatus of an enrollment database includes a memory configured to store the enrollment database and storing computer-readable instructions, and one or more processors configured to execute the computer-readable instructions such that the one or more processors is configured to extract a first feature vector from an input image, the input image including a face of a user, and the processor further configured to enroll the input image by determining whether to enroll the input image in the enrollment database based on the first feature vector, second feature vectors of enrollment images and a representative vector, the second vectors of the enrollment images being enrolled in the enrollment database, and the representative vector representing the second feature vectors.

Example embodiments provide that the one or more processors may be configured to execute the computer-readable instructions such that the one or more processors is configured to determine at least one of (i) whether the input image is an outlier based on the first feature vector, the second feature vectors, and the representative vector and (ii) whether a feature range of the enrollment database is increased based on the first feature vector and the second feature vectors.

Example embodiments provide that the one or more processors may be configured to execute the computer-readable instructions such that the one or more processors is configured to calculate a minimum distance between the first feature vector and the second feature vectors, calculate a representative distance between the first feature vector and the representative vector, and determine whether the input image is the outlier based on the minimum distance and the representative distance.

Example embodiments provide that the one or more processors may be configured to execute the computer-readable instructions such that the one or more processors is configured to determine an accumulation feature distance corresponding to each vector in a vector set based on distances between the corresponding vector and remaining vectors in the vector set, the vector set including the first feature vector and the second feature vectors, and the one or more processors is configured to execute the computer-readable instructions such that the one or more processors is further configured to determine whether a feature range of the enrollment database is extended based on whether the accumulation feature distance corresponding to the first feature vector is greater than at least one of the accumulation feature distances corresponding to the second feature vectors.

Example embodiments provide that the one or more processors may be configured to execute the computer-readable instructions such that the one or more processors is configured to replace the enrollment image corresponding to the second feature vector having a minimum accumulation feature distance among the enrollment images with the input image if the accumulation feature distance corresponding to the first feature vector is greater than the at least one of the accumulation feature distances corresponding to the second feature vectors.

Example embodiments provide that the one or more processors may be configured to execute the computer-readable instructions such that the one or more processors is configured to determine whether to add the input image or to replace one of the enrollment image in the enrollment database based on a number of the enrollment images enrolled in the enrollment database and a maximum enrollment number of the enrollment database.

Example embodiments provide that the one or more processors may be configured to execute the computer-readable instructions such that the one or more processors is configured to authenticate the user based on the first feature vector, the second feature vectors, and the representative vector, and the one or more processors is further configured to execute the computer-readable instructions such that the one or more processors is configured to determine whether to enroll the input image in the enrollment database based on the authenticating the user.

At least one example embodiment relates to a method of adaptively updating an enrollment database.

According to still another example embodiment, the method of adaptively updating the enrollment database includes authenticating an input image, determining whether the input image is an outlier, determining whether a feature range of the enrollment database is increased by the input image, and replacing one of enrollment images in the enrollment database with the input image based on the determining whether the feature range of the enrollment database is increased by the input image.

Example embodiments provide that the determining whether the input image is the outlier may include calculating a minimum distance between a first feature vector extracted from the input image and second feature vectors and the second feature vectors of the enrollment images, the first feature vector extracted from the enrollment images in the enrollment database, calculating a representative distance between the first feature vector and a representative vector, the representative representing the second feature vectors, and determining whether a first condition associated with the minimum distance and a second condition associated with the representative distance are satisfied.

Example embodiments provide that the determining whether the feature range of the enrollment database is increased by the input image may include calculating an accumulation feature distance corresponding to each vector in a vector set, the vector set including a first feature vector and second feature vectors, the first feature vector extracted from the input image and the second feature vectors extracted from the enrollment images in the enrollment database, and determining whether an accumulation feature distance corresponding to the first feature vector is greater than at least one of the accumulation feature distances corresponding to the second feature vectors.

Example embodiments provide that the calculating of the accumulation feature distance corresponding to each vector may include adding distances between the vector corresponding to the accumulation feature distance and remaining vectors in the vector set.

At least one example embodiment relates to an adaptive updating apparatus of an enrollment database.

According to further example embodiment, the adaptive updating apparatus of the enrollment database may include a memory storing computer-readable instructions and one or more processors configured to execute the computer-readable instructions such that the one or more processors is configured to authenticate an input image based on enrollment database, determine whether the input image is an outlier based on a representative vector, the representative vector representing enrollment images in the enrollment database, and the one or more processors is further configured to execute the computer-readable instructions such that the one or more processors is configured to adaptively update the enrollment database based on a result of the authenticating and a result of the determining.

Example embodiments provide that, to determine whether the input image is the outlier, the one or more processors is configured to execute the computer-readable instructions such that the one or more processors is configured to calculate a minimum distance between a first feature vector and second feature vectors, the first feature vector extracted from the input image and the second feature vectors extracted from the enrollment images in the enrolment database, the one or more processors is further configured to execute the computer-readable instructions such that the one or more processors is configured to calculate a representative distance between the first feature vector and the representative vector, and determine whether a first condition associated with the minimum distance and a second condition associated with the representative distance are satisfied.

Example embodiments provide that the one or more processors may be configured to update the representative vector by the first feature vector when the input image is enrolled in the enrollment database.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
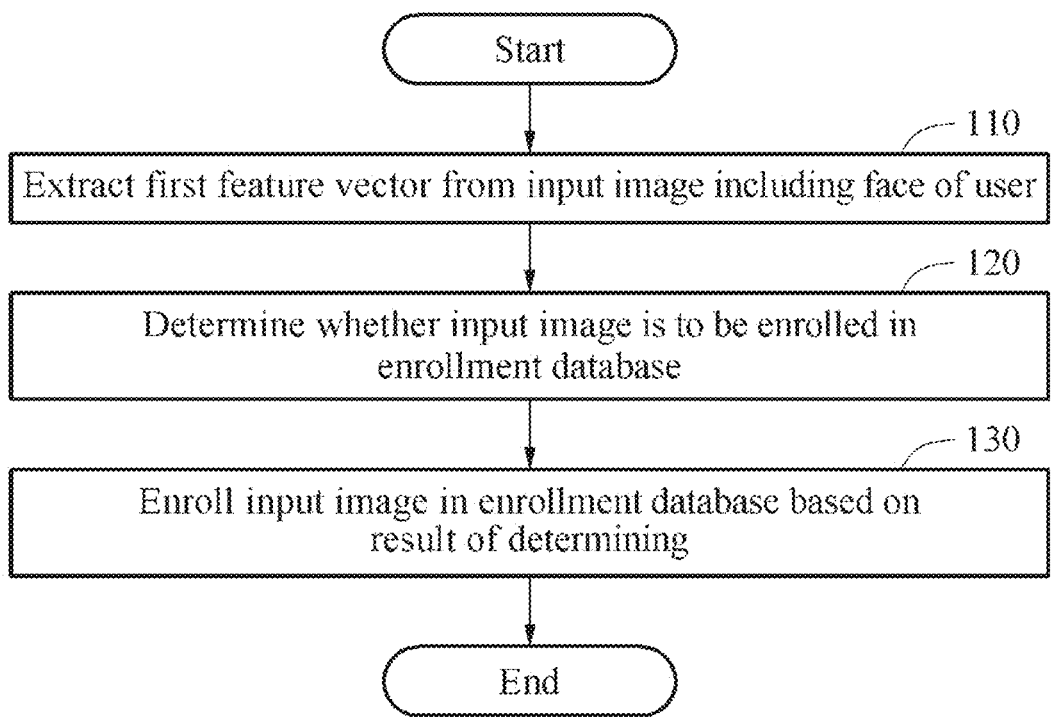
FIG. 1 is a flowchart illustrating an adaptive updating method of an enrollment database according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of non-transitory computer-readable storage medium.

Example embodiments may be used for recognizing a face of a user. An operation of recognizing the face of the user may include an operation of authenticating or identifying the user. In an example, the operation of authenticating the user may include an operation of determining whether the user is a pre-enrolled user. In this example, a result of the authenticating of the user may be output as true or false. In another example, the operation of identifying the user may include an operation of determining that the user corresponds to any one user among a plurality of pre-enrolled users. In this example, a result of the identifying of the user may be output as an identification (ID) of any one pre-enrolled user. When the user does not correspond to any one user among the plurality of pre-enrolled users, a signal notifying that the user is not identified may be output.

Example embodiments may be implemented as various types of products, for example, personal computers, laptop computers, tablet computers, smart phones, televisions, smart home appliances, intelligent vehicles, kiosks, and wearable devices. For example, the examples may be applied to authenticate a user using a device/system such as a smart phone, a mobile device, and a smart home system. In the same manner, example embodiments may be applied to a payment service through user authentication. Example embodiments may be also applied to an intelligent vehicle system to automatically start a vehicle through user authentication. Hereinafter, reference will now be made in detail to examples with reference to the accompanying drawings, wherein like reference numerals refer to like elements throughout.

FIG. 1 is a flowchart illustrating an example of an adaptive updating method of an enrollment database according to at least one example embodiment. For example, an updating apparatus for performing the adaptive updating method may be included in a user authentication apparatus or may be provided as an additional apparatus. The updating apparatus may be provided as hardware configured to execute software, hardware, or a combination thereof such as firmware. The enrollment database may be referred to as an enrollment template.

Referring to FIG. 1, in operation 110, the updating apparatus extracts a first feature vector from an input image including a face of a user. The first feature vector may be understood as a vector indicating a feature for face recognition extracted from the input image. The updating apparatus may extract the first feature vector from the input image based on various schemes such as a local binary pattern (LBP) scheme, a Gabor scheme, or a deep learning scheme.

In operation 120, the updating apparatus determines whether the input image is to be enrolled in the enrollment database. For example, the updating apparatus may perform authentication of the input image, determine whether the input image is an outlier, and determine whether the input image is to be enrolled in the enrollment database.

The updating apparatus may use a first feature vector, second feature vectors, and a representative vector. A second feature vector(s) may be understood as a vector(s) indicating a feature for the face recognition extracted from an enrollment image(s) enrolled in the enrollment database. The second feature vector(s) may be extracted based on the LBP scheme, the Gabor scheme, and the deep learning scheme. The representative vector may be a vector representing the second feature vectors, and the representative vector may be calculated based on statistical calculation, for example, a median, an average and a standard deviation, of the second feature vectors.

Second feature vectors $x_i$ and a representative vector $\tilde{x}$ are determined by the updating apparatus from enrollment images $X_1, X_2, \ldots,$ and $X_n$ as shown in Equation 1.

$$x_i = f(X_i) \text{ for } i = 1, \ldots, n \quad \text{[Equation 1]}$$
$$\tilde{x} = \frac{1}{n}\sum_{1}^{n} x_i$$

In Equation 1, n denotes a number of enrollment images enrolled in the enrollment database.

The updating apparatus may perform the authentication of the input image based on the first feature vector, the second feature vectors, and the representative vector. In an example, the updating apparatus may perform the authentication of the input image by comparing vectors in a set of {second feature vectors and a representative vector} to the first feature vector.

The updating apparatus may calculate a minimum distance between the first feature vector and the vectors in the set of {the second feature vectors and the representative vector}. A distance between the first feature vector and the vectors in the set of {the second feature vectors and the representative vector} may be understood as, for example, a Euclidean distance inversely proportional to a similarity among feature vectors. The updating apparatus may calculate a minimum distance $d_n$ using Equation 2.

$$d_n = \min\{d(x_1, y), \ldots, d(x_n, y), d(\tilde{x}, y)\} \quad \text{[Equation 2]}$$

In Equation 2, y denotes a first feature vector, $x_1$ through $x_n$ denote the second feature vectors, $\tilde{x}$ denotes the representative vector, and $d_n$ denotes the minimum distance between the first feature vector and the vectors in the set of {the second feature vectors and the representative vector}.

When the minimum distance $d_n$ is less than a first threshold distance, the updating apparatus may determine that the authentication of the input image succeeds. The first threshold distance may be predetermined and/or selected as a distance corresponding to 1% of a false acceptance rate (FAR). The FAR may be a rate of falsely recognizing another user as a user.

The updating apparatus may use a similarity instead of a distance. In this example, the updating apparatus may calculate a maximum similarity between the first feature vector and the vectors in the set of {the second feature vectors and the representative vector}. When the maximum similarity is greater than a first threshold similarity, the updating apparatus may determine that the authentication of the input image succeeds. The first threshold similarity may be predetermined and/or selected as a similarity corresponding to an FAR of 1%.

In another example, the updating apparatus may determine whether the authentication of the input image succeeds or fails by comparing the first feature vector to the second feature vectors.

Even when the authentication of the input image succeeds, the input image may actually be falsely accepted. For example, even though the input image corresponds to a user in an authenticating process based on a result of the determination, the input image may actually correspond to an image of another user. To prevent the falsely accepted input image from being enrolled in the enrollment database, the updating apparatus may determine whether the input image is to be enrolled in the enrollment database based on a second condition which is stricter than a first condition for the authentication. The second condition may be a condition that determines whether the input image is the outlier.

In this example, the outlier may be understood as an image corresponding to another user other than a user even when the authentication succeeds.

The updating apparatus may determine whether the input image is the outlier based on the first feature vector, the second feature vectors, and the representative vector. For example, the updating apparatus may examine two conditions. Firstly, the updating apparatus may examine whether a minimum distance between the first feature vector and the second feature vectors is less than a predetermined and/or selected second threshold distance. In this example, the second threshold distance may be determined to be stricter than a first threshold distance for the authentication of the input image. For example, the second threshold distance may be a distance corresponding to an FAR of 0.01%. Secondly, the updating apparatus may examine whether a distance between the first feature vector and the representative vector is less than a predetermined and/or selected third threshold distance. The third threshold distance may be determined to be identical to the second threshold distance, or determined to be different from the second threshold distance.

For example, the updating apparatus may use the similarity instead of the distance. In this example, the updating apparatus may examine whether a maximum similarity between the first feature vector and the second feature vectors is greater than a predetermined and/or selected second threshold similarity. The second threshold similarity may be, for example, a similarity corresponding to the FAR of 0.01%. The updating apparatus may examine whether a similarity between the first feature vector and the representative vector is greater than a predetermined and/or selected third threshold similarity.

The updating apparatus may determine that the input image is not the outlier when the two aforementioned conditions are passed. When the input image is not the outlier, the updating apparatus may determine that the input image is to be enrolled in the enrollment database. When the input image is the outlier, the updating apparatus may determine that the input image is not to be enrolled in the enrollment database. Based on a result of the determining that the input image is to be enrolled in the enrollment database, the updating apparatus enrolls the input image in the enrollment database in operation 130. To enroll may be understood as to add the input image to the enrollment database and replace any one of the enrollment images within the input image in the enrollment database, when a number of enrolled images is equal to or greater than a predetermined and/or selected threshold number.

In an example, when a number of the enrollment images included in the enrollment database is less than the predetermined and/or selected threshold number, for example, 10, enrolling may refer to the updating apparatus adding the input image to the enrollment database. It should be understood that the threshold number may be greater than or smaller than 10

In another example, when the number of the enrollment images included in the enrollment database is equal to the threshold number, the updating apparatus may replace the any one of the enrollment images with the input image based on whether a feature range of the enrollment database is extended by the input image. In this example, extending the feature range of the enrollment database may be understood as varying face changes of the user recognized based on the enrollment images included in the enrollment database. The face changes of the user may be caused by various elements, for example, a makeup style, a hair style, a beard, and a weight.

The updating apparatus may determine whether the input image extends the feature range of the enrollment database based on the first feature vector and the second feature vectors. A method of determining whether a feature range of an enrollment database is extended will be described with reference to FIG. 6.

Figures 2A, 2B, 2C:
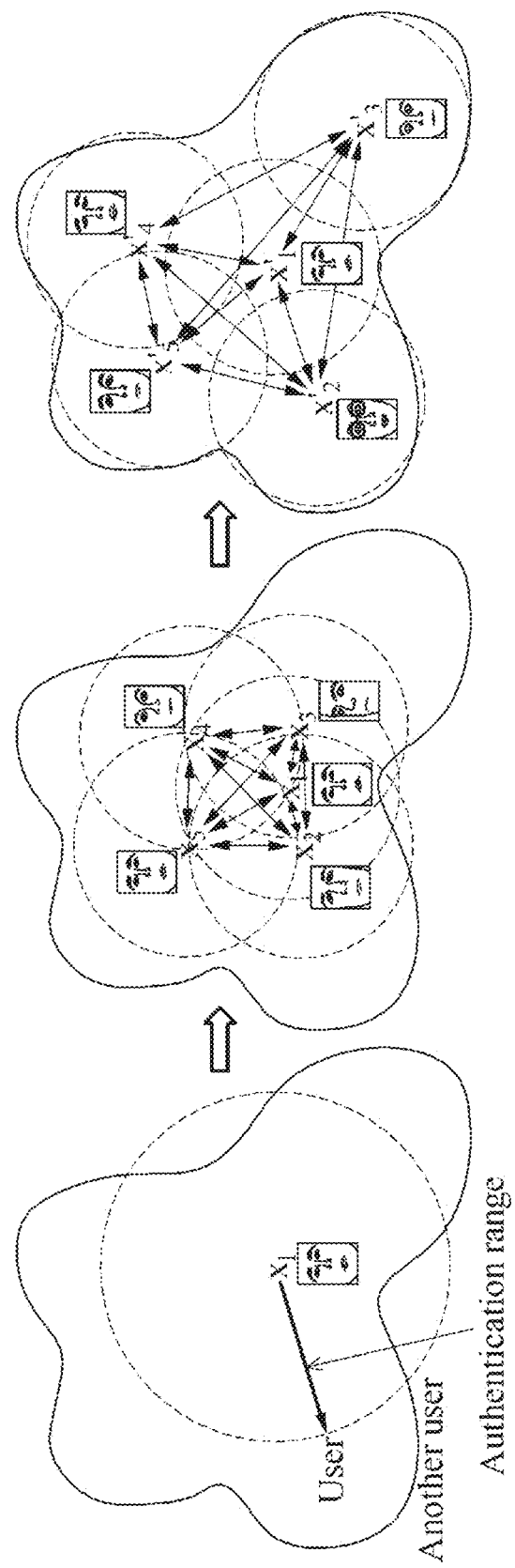
FIGS. 2A through 2C illustrate a method of increasing a user authentication rate by an adaptive update of an enrollment database according to at least one example embodiment.

An updating apparatus may prevent an image corresponding to another user from being enrolled in an enrollment database, and may adaptively update the enrollment database such that various images corresponding to an authorized user are included in the enrollment database. A user authentication rate may be enhanced based on the adaptively updated enrollment database. FIGS. 2A through 2C illustrate a method of increasing a user authentication rate by an adaptive update of an enrollment database according to at least one example embodiment. Referring to FIGS. 2A through 2C, when the enrollment images in the enrollment database are adaptively added or replaced, an authentication range by the enrollment images in the enrollment database may be improved to effectively cover a range corresponding to a user. Each circle illustrated in a radial form from each enrollment image represents an authentication range by a corresponding enrollment image.

Referring to FIG. 2A, an authentication range by an enrollment image $X_1$ when the enrollment image $X_1$ is enrolled in the enrollment database is illustrated. As described above, since a face has various change elements, for example, in a lighting, a makeup style, a hair style, a beard, and a weight, a single enrollment image may not effectively cover an authentication range corresponding to a user. Thus, a recognition rate, for example, a verification rate (VR), may be low and a false rejection rate (FRR) may be great. The recognition rate may be a rate of appropriately recognizing the user, and the FRR may be a rate of falsely rejecting the user. Although not illustrated in drawings, an authentication range of the enrollment image $X_1$ may need to be extended to a range in which another user is misrecognized as the user, in order to entirely cover a range corresponding to the user only with the enrollment image $X_1$.

Referring to FIG. 2B, an authentication range when a plurality of enrollment images $X_1$, $X_2$, $X_3$, $X_4$, and $X_5$ are added to the enrollment database is illustrated. When the enrollment images $X_2$, $X_3$, $X_4$, and $X_5$ are added to the enrollment database, a recognition rate may increase when compared to when the one enrollment image $X_1$ is enrolled in the enrollment database.

In an example, a false acceptance rate (FAR) may be decreased by setting an authentication range of an individual enrollment image to be relatively narrow, while increasing the recognition rate using features, for example, second feature vectors, of a plurality of enrollment images and a representative feature, for example, an average vector, of the enrollment images.

Referring to FIG. 2C, an authentication range when the enrollment database is replaced with the enrollment images $X'_1$, $X'_2$, $X'_3$, $X'_4$, and $X'_5$ is illustrated. When the enrollment images $X'_1$, $X'_2$, $X'_3$, $X'_4$, and $X'_5$ are widely provided in a range corresponding to the user, the recognition rate with respect to variously changing face of the user may increase.

In an example, enrollment images may be replaced (periodically, dynamically and/or at an indicated time) to maintain distances between the enrollment images enrolled in an enrollment database to increase widths (e.g., to a maximum desired width) between the enrolled images, such that the recognition rate increases thereby increasing the ability to adapt to a face change of the user. In this example, maintaining and/or increasing the distances between the enrollment images may be understood as decreasing similarities between the enrollment images to allow the enrollment images to represent various changes of the user. In this example, an outlier may be required to be excluded from the enrollment images even when the distances between the enrollment images are maintained and/or increased. A method of excluding an outlier from enrollment images will be described with reference to FIG. 3.

In an example, a range corresponding to a user may be effectively covered by adding and replacing the enrollment images $X_1$, $X_2$, $X_3$, $X_4$, and $X_5$ with $X'_1$, $X'_2$, $X'_3$, $X'_4$, and $X'_5$ as illustrated in FIGS. 2B and 2C, thereby increasing the recognition rate with respect to an input image while decreasing the FAR and the FRR.

Figure 3A:
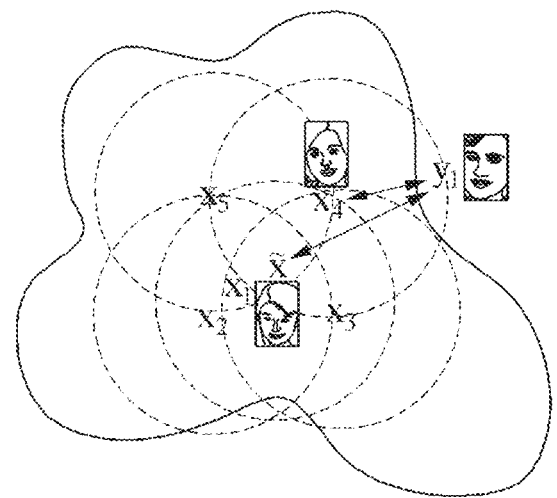
FIGS. 3A and 3B illustrate a method of determining whether an input image is an outlier according to at least one example embodiment.
Figure 3B:
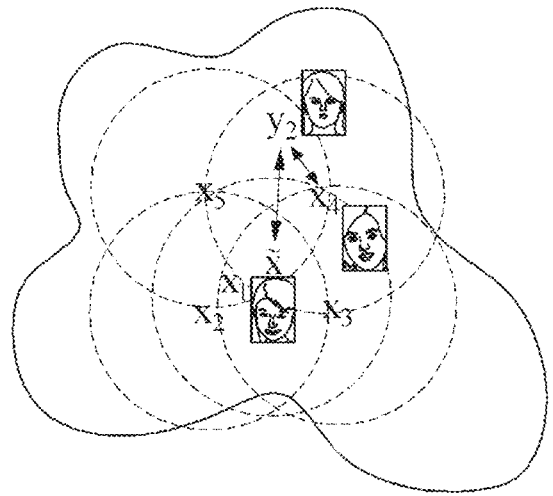

FIGS. 3A and 3B illustrate examples of a method of determining whether an input image is an outlier according to at least one example embodiment. The methods shown in FIGS. 3A-3B may be performed by the updating apparatus. FIG. 3A illustrates a case in which an input image is determined to be an outlier, and FIG. 3B illustrates a case in which the input image is determined not to be the outlier. An enrollment database may include second feature vectors $x_1$, $x_2$, $x_3$, $x_4$, and $x_5$ of enrollment images and a representative vector $\tilde{x}$ representing the second feature vectors $x_1$, $x_2$, $x_3$, $x_4$, and $x_5$. The representative vector $\tilde{x}$ may correspond to a representative feature, for example, an average feature, of the enrollment images.

Referring to FIG. 3A, a distance between a first feature vector $y_1$ of a first input image and a feature vector $x_4$ of a fourth enrollment image stored in the enrollment database is less than a predetermined and/or selected second threshold distance, but a distance between the first feature vector $y_1$ and the representative vector $\tilde{x}$ of the enrollment images may be greater than a predetermined and/or selected third threshold distance. In this example, even when the first input image is similar to the fourth enrollment image, it may be determined that the first input image is not similar to an image representing the enrollment images stored in the enrollment database.

Even when the input image is determined to be similar to at least one of the enrollment images stored in the enrollment database, the updating apparatus may not enroll the input image in the enrollment database when it is determined that the input image is not similar to the image representing the enrollment images. Thus, example embodiments may prevent an outlier from being included in the enrollment database.

Referring to FIG. 3B, a distance between a first feature vector $y_2$ of a second input image and the feature vector $x_4$ of the fourth enrollment image stored in the enrollment database is less than the second threshold distance, and a distance between the first feature vector $y_2$ and the representative vector $\tilde{x}$ may be less than the third threshold distance. Thus, the second input image may indicate that the second input image has a distance greater than or equal to a predetermined and/or selected reference with all the enrollment images. The updating apparatus may determine that the second input image corresponding to the first feature vector $y_2$ as an image corresponding to the user, and enroll the second input image in the enrollment database.

Figure 4:
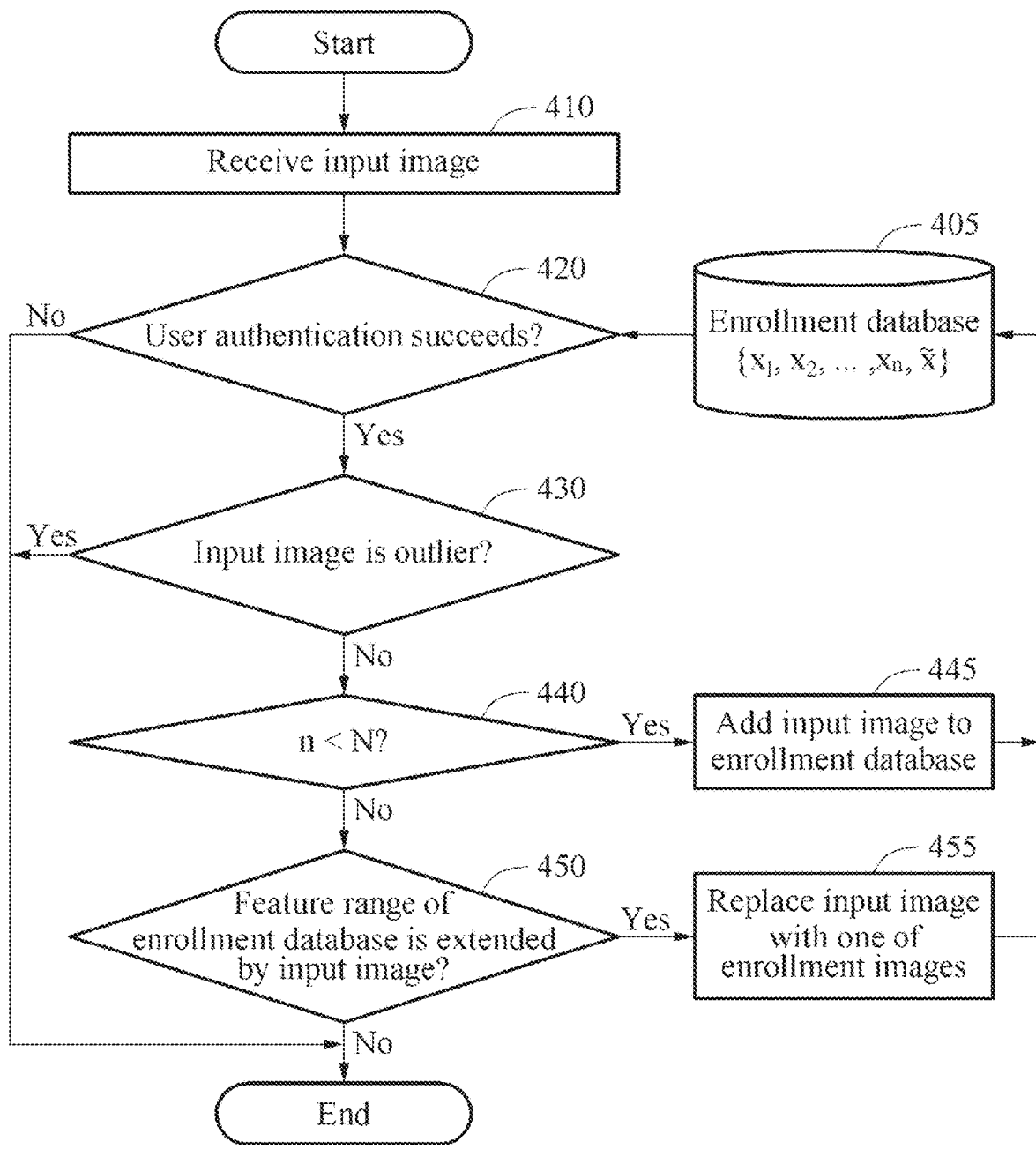
FIG. 4 is a flowchart illustrating an adaptive updating algorithm of an enrollment database according to at least one example embodiment.

FIG. 4 is a flowchart illustrating an example of an adaptive updating algorithm of an enrollment database according to at least one example embodiment. Referring to FIG. 4, in operation 410, an updating apparatus receives an input image, Y. The updating apparatus may extract a first feature vector from the input image Y. In operation 420, the updating apparatus determines whether user authentication succeeds or fails. For example, the updating apparatus may perform the user authentication using the first feature vector and an enrollment database. When the user authentication fails, the updating apparatus may terminate an operation without enrolling the input image Y in the enrollment database.

When the user authentication succeeds, the updating apparatus determines whether the input image Y is an outlier in operation 430. The updating apparatus may determine whether the input image Y is the outlier by examining the two conditions described with reference to FIG. 1.

Various conditions for determining whether an input image is an outlier may be used by the updating apparatus. For example, the updating apparatus may determine whether the input image is the outlier using Equation 3.

$$\text{If } \underset{i=1\sim N}{n}(d(x_i, y) < T_3) \geq 2 \text{ and } (d(\tilde{x}, y) < T_3), \qquad \text{[Equation 3]}$$

then y is enrollment update candidate

In Equation 3, y denotes a first feature vector, $x_i$ denotes an i-th second feature vector, N denotes a number of second feature vectors, and $\tilde{x}$ denotes a representative vector. $d(x_i, y)$ denotes a distance between the first feature vector y and the i-th second feature vector $x_i$, and $d(\tilde{x}, y)$ denotes a distance between the first feature vector y and the representative vector $\tilde{x}$.

Based on Equation 3, among N second feature vectors, when the updating apparatus determines a number of second feature vectors of which a distance with the first feature vector y is less than a threshold value $T_3$ is greater than or equal to 2 and a distance between the first feature vector y and the representative vector $\tilde{x}$ is less than the threshold value $T_3$, the first feature vector may be determined to be an enrollment update candidate and not an outlier. In an another example embodiment, $d(x_i,y)<T_2$, where $T_2$ is the second threshold distance/similarity, replaces $d(x_i,y)<T_3$.

When the input image Y is determined to be the outlier by the updating apparatus, the updating apparatus may terminate the operation without enrolling the input image Y in the enrollment database.

In operation 440, when the input image Y is determined not to be the outlier by the updating apparatus, the updating apparatus may compare a number n of the enrollment images enrolled in the enrollment database to a maximum enrollment number N of the enrollment database.

In operation 445, when by the updating apparatus determines the number n of the enrollment images is less than the maximum enrollment number N, the updating apparatus may add the input image Y to the enrollment database. When the input image Y is added to the enrollment database, the representative vector $\tilde{x}$ representing the enrollment database may be updated by the updating apparatus. For example, when the input image Y is added to the enrollment database, the representative vector $\tilde{x}$ may be updated as shown in Equation 4.

$$x_{n+1} = y$$
$$n \leftarrow n + 1$$
$$\tilde{x} = \frac{1}{n}\sum_{1}^{n} x_i$$

[Equation 4]

In operation 450, when the number n of the enrollment images is greater than or equal to the maximum enrollment number N, the updating apparatus determines whether a feature range of the enrollment database is extended by the input image Y. A method of determining whether the feature range of the enrollment database is extended by the input image Y will be described with reference to FIGS. 6A-6C. When the feature range of the enrollment database is determined not to be extended by the input image Y, the updating apparatus may terminate an operation without enrolling the input image Y in the enrollment database. When the feature range of the enrollment database is determined to be extended by the input image Y, the updating apparatus replaces any one of the enrollment images enrolled in the enrollment database with the input image Y in operation 455. In an example, the updating apparatus may determine whether to enroll the input image Y in the enrollment database using Equation 5.

$$\text{Let } x_{N+1} = y$$
$$S_i = \sum_{j=1}^{N+1} d(x_i, x_j) \text{ for } i = 1, \ldots, N+1$$

[Equation 5]

-continued $$i_{min} = \underset{i}{\operatorname{argmin}} S_i$$

If $i_{min} \leq N$, then enroll y

In more detail, the updating apparatus may set the first feature vector y as an N+1-th second feature vector $x_{N+1}$. The updating apparatus may calculate an accumulation feature distance $S_i$ corresponding to each of N+1 second feature vectors. When an index $i_{min}$ of a minimum accumulation feature distance among accumulation feature distances is less than or equal to N, the updating apparatus may replace the $i_{min}$-th image with the input image Y. When the input image Y has the minimum accumulation feature distance, the updating apparatus may not perform replacing. When an existing enrollment image has the minimum accumulation feature distance, the updating apparatus may replace the corresponding enrollment image (the enrollment image having the minimum accumulation feature distance) with the input image Y.

When the input image Y is replaced with any one of the enrollment images of the enrollment database, the representative vector $\tilde{x}$ representing the enrollment database may be updated.

In an example, when the input image Y is not the outlier and the input image Y extends the feature range, for example, an authentication range, of the enrollment images, the input image Y may be replaced with an existing enrollment image to secure a diversity of the enrollment images included in the enrollment database.

Repeated descriptions will be omitted for increased clarity and conciseness because operation 410 corresponds to operation 110 of FIG. 1, operations 420 and 430 correspond to operation 120 of FIG. 1, and operations 440, 445, 450, and 455 correspond to operation 130 of FIG. 1.

Figure 5:
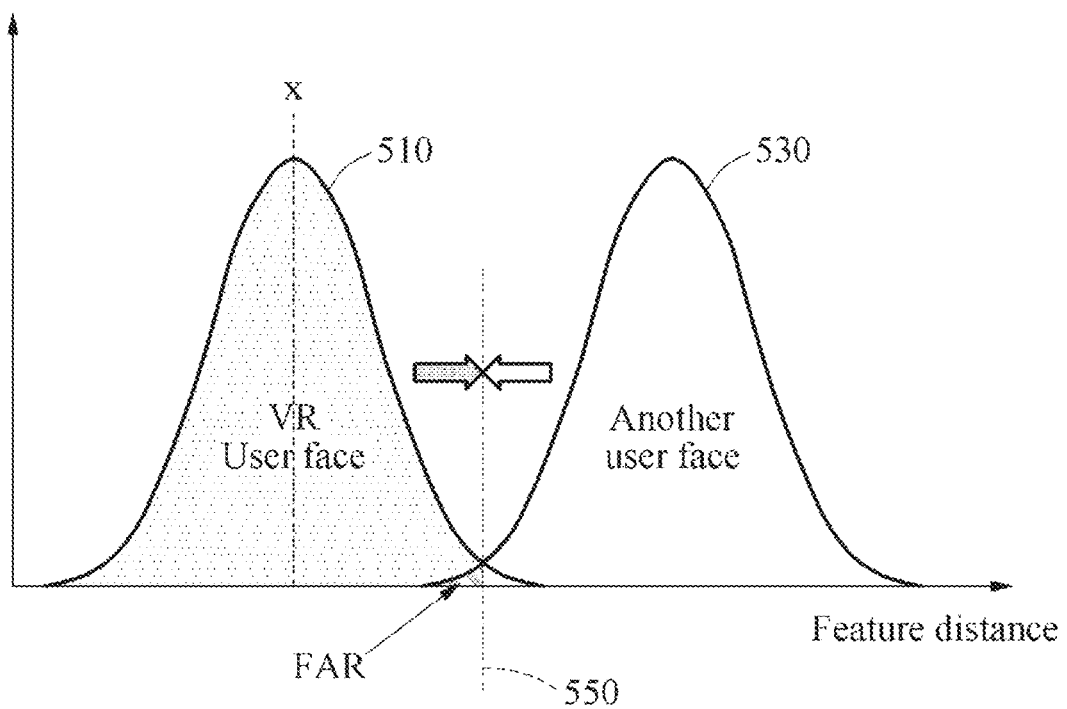
FIG. 5 is a graph illustrating a method of determining a threshold according to at least one example embodiment.

FIG. 5 is a graph illustrating an example of a method of determining a threshold according to at least one example embodiment. The method may be used to determine a threshold distance and a threshold similarity for user authentication, and a threshold distance and a threshold similarity for an outlier determination. The threshold may be determined based on various performance indexes. For example, the threshold may be determined based on a recognition rate, a false acceptance rate (FAR), a false rejection rate (FRR), and various combinations thereof.

Referring to FIG. 5, a normal distribution curve 510 with respect to feature distances between images of a user and a normal distribution curve 530 with respect to feature distances between images of another user are illustrated. Here, a feature distance may be understood as a distance inversely proportional to a similarity between images. In the graph of FIG. 5, an x-axis indicates a feature distance between two images, and a y-axis indicates a value of a probability density function corresponding to the feature distance.

In an example, to set a first threshold distance for the user authentication as a distance corresponding to an FAR of 1%, the updating apparatus may set, as the first threshold distance, a feature distance of a boundary line 550 that differentiate an area of the bottom 1% of an entire area of the normal distribution curve 530 with respect to the feature distances between the images of another user.

Figure 6A:
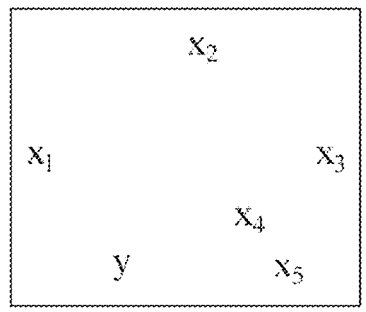
FIGS. 6A through 6C illustrate a method of determining whether a feature range of an enrollment database is extended by an input image according to at least one example embodiment.
Figure 6B:
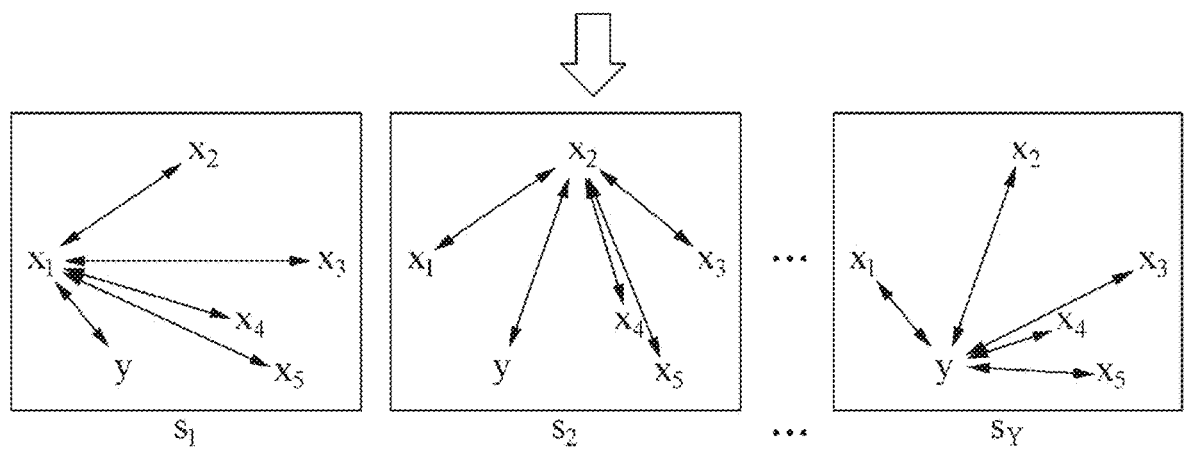
Figure 6C:
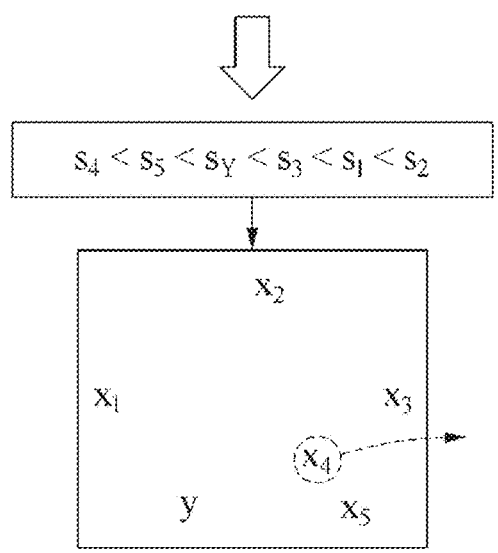

FIGS. 6A through 6C illustrate examples of a method of determining whether a feature range of an enrollment database is extended by an input image according to at least one example embodiment. FIG. 6A illustrates a first feature vector y of an input image and a vector set including second feature vectors $x_1$, $x_2$, $x_3$, $x_4$, and $x_5$ of enrollment images when the input image is received.

An updating apparatus may determine an accumulation feature distance s corresponding to each vector as illustrated in FIG. 6B based on a sum of distances between any one vector and remaining vectors in the vector set as illustrated in FIG. 6A. For example, the updating apparatus may determine an accumulation feature distance $s_1$ corresponding to the second feature vector $x_1$ by adding up a distance between the second feature vector $x_1$ and a first feature vector y, and distances between the second feature vector $x_1$ and each of the remaining feature vectors $x_2$, $x_3$, $x_4$, and $x_5$. Based on the foregoing method, the updating apparatus may determine an accumulation feature distance $s_y$ corresponding to the first feature vector y, and accumulation feature distances $s_2$, $s_3$, $s_4$, and $s_5$ corresponding to the remaining second feature vectors $x_2$, $x_3$, $x_4$, and $x_5$, respectively.

The updating apparatus may determine whether the accumulation feature distance $s_y$ corresponding to the first feature vector y is greater than one of the accumulation feature distances $s_1$, $s_2$, $s_3$, $s_4$, and $s_5$ corresponding to the second feature vectors $x_1$, $x_2$, $x_3$, $x_4$, and $x_5$. The updating apparatus may replace an enrollment image with an input image when the accumulation feature distance $s_y$ corresponding to the first feature vector y is greater than one of the accumulation feature distances $s_1$, $s_2$, $s_3$, $s_4$, and $s_5$ corresponding to the second feature vectors $x_1$, $x_2$, $x_3$, $x_4$, and $x_5$. The updating apparatus may replace, with the input image, an enrollment image corresponding to a second feature vector having a minimum accumulation feature distance among accumulation feature distances.

For example, when lengths of the accumulation feature distances $s_1$, $s_2$, $s_3$, $s_4$, and $s_5$ of each feature vector are $s_4 < s_5 < s_y < s_3 < s_1 < s_2$, the accumulation feature distance $s_y$ corresponding to the first feature vector y may be greater than the accumulation feature distances $s_4$ and $s_5$ corresponding to the second feature vectors $x_4$ and $x_5$. The updating apparatus may replace, with the input image, any one of enrollment images corresponding to the second feature vectors $x_4$ and $x_5$ having the accumulation feature distances $s_4$ and $s_5$. The updating apparatus may replace, with the input image, an enrollment image corresponding to the second feature vector $x_4$ having the minimum accumulation feature distance $s_4$. A result of replacing the enrollment image corresponding to the second feature vector $x_4$ by the input image is illustrated in FIG. 6C. In another example embodiment, the updating apparatus may replace, with the input image, an enrollment image corresponding to a second feature vector having a non-minimal accumulation feature distance (e.g., second feature vector $x_5$).

The updating apparatus may widen feature distances between enrollment images to increase a recognition rate with respect to variously changed input images by replacing and comparing the input images and feature distances of the enrollment images.

Figure 7:
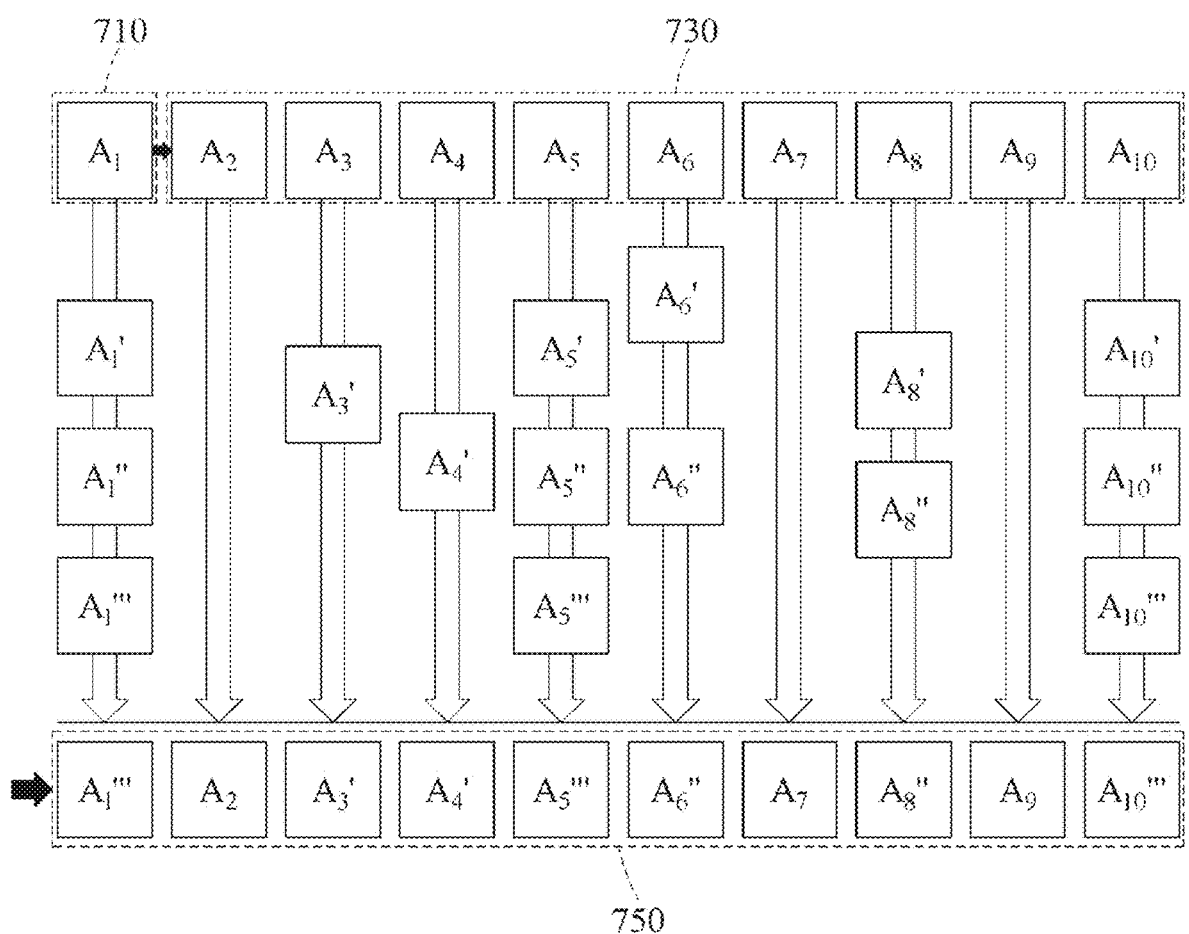
FIG. 7 illustrates adaptively updated enrollment images in an enrollment database according to at least one example embodiment.
Figure 8:
FIG. 8 illustrates feature distances of initially enrolled enrollment images and feature distances of finally updated enrollment images in an enrollment database according to at least one example embodiment.

FIG. 7 illustrates examples of adaptively updated enrollment images in an enrollment database according to at least one example embodiment, and FIG. 8 illustrates an example of feature distances of initially enrolled enrollment images in FIG. 7 and feature distances of finally updated enrollment images in an enrollment database according to at least one example embodiment.

FIG. 7 illustrates an initial enrollment image $A_1$ 710, and added nine enrollment images $A_2$, $A_3$, $A_4$, $A_5$, $A_6$, $A_7$, $A_8$, $A_9$, and $A_{10}$ 730, and finally replaced ten enrollment images $A_1'''$, $A_2$, $A_3'$, $A_4'$, $A_5'''$, $A_6''$, $A_7$, $A_8''$, $A_9$, and $A_{10}'''$ 750. In FIG. 7, $A_1'$ indicates an image replaced once to correspond to the initial enrollment image $A_1$ 710, $A_1''$ indicates an image replaced twice, and $A_1'''$ indicates an image replaced three times. The same notation applies to the nine enrollment images 730.

In FIG. 8, an upper drawing represents feature distances between enrollment images initially enrolled in an enrollment database, and a lower drawing represents feature distances between enrollment images finally enrolled in the enrollment database. Referring to FIG. 8, the feature distances between the finally enrolled enrollment images may have relatively great values compared to those of the initially enrolled enrollment images.

In an example, authentication performance with respect to variously changed face images may be enhanced by maintaining feature distances between enrollment images to be relatively wide by adding and replacing the enrollment images.

Figure 9:
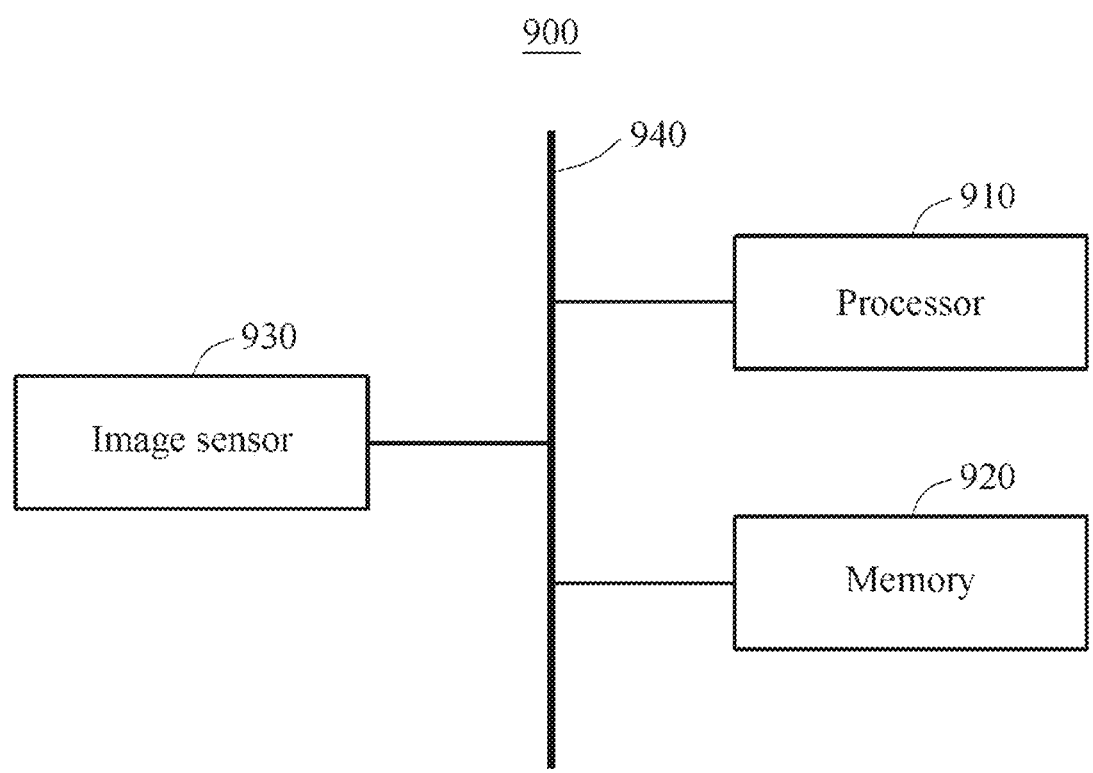
FIG. 9 is a block diagram illustrating an adaptive updating apparatus of an enrollment database according to at least one example embodiment.

FIG. 9 is a block diagram illustrating an example of an adaptive updating apparatus of an enrollment database according to at least one example embodiment. Referring to FIG. 9, an updating apparatus 900 includes a processor 910, a memory 920, and an image sensor 930. The processor 910, the memory 920, and the image sensor 930 may communicate with each other through a bus 940.

The processor 910 adaptively updates an enrollment database using pre-enrolled enrollment images and an input image including a face of a user.

The processor 910 extracts a first feature vector from the input image including the face of the user. The processor 910 determines whether the input image is to be enrolled in the enrollment database based on the first feature vector, second feature vectors of the enrollment images enrolled in the enrollment database, and a representative vector representing the second feature vectors. The processor 910 enrolls the input image in the enrollment database based on a result of the determining.

The processor 910 determines at least one of whether the input image is an outlier based on the first feature vector, the second feature vectors, and the representative vector and whether a feature range of the enrollment database is extended based on the first feature vector and the second feature vectors. When the input image is not the outlier and a number of the enrollment images is less than a maximum enrollment number, the processor 910 adds the input image to the enrollment database. When the number of the enrollment images is greater than or equal to the maximum enrollment number, the processor 910 additionally determines whether the feature range of the enrollment database is extended. When the feature range is extended, the processor 910 replaces the input image with any one of the enrollment images.

The processor 910 may perform at least one of the methods described with reference to FIGS. 1 through 8.

The processor 910 performs the functions of the updating apparatus 900 and those described with reference to FIGS. 1-8 by executing computer-readable instructions stored in the memory 920. The processor 910 may be one or more processors. The updating apparatus 900 may be connected to an external device, for example, a personal computer or a network, through an input and output device (not shown), and may exchange data.

The memory 920 stores an enrollment database 925 including the pre-enrolled enrollment images. The memory 920 includes the first feature vector, the second feature vectors of the enrollment images, and the representative vector representing the second feature vectors extracted from the input image. The memory 920 stores a newly enrolled input image and a representative vector updated by the newly enrolled input image. The memory 920 may be a volatile memory or a non-volatile memory. The image sensor 930 captures the input image including the face of the user.

The updating apparatus 900 may be provided in a combination of software module and hardware. A function provided by the software may be performed by a processor, and a function provided by the hardware may be performed by corresponding hardware. The processor and the hardware may interchange a signal through an input and output bus.

The updating apparatus 900 may include a mobile device such as a mobile phone, a smartphone, a PDA, a tablet computer, a laptop computer, and the like, a computing device such as a personal computer, the tablet computer, a netbook, and the like, and various electronic systems such as a TV, a smart TV, a security device for a gate control, and the like.

Figure 10:
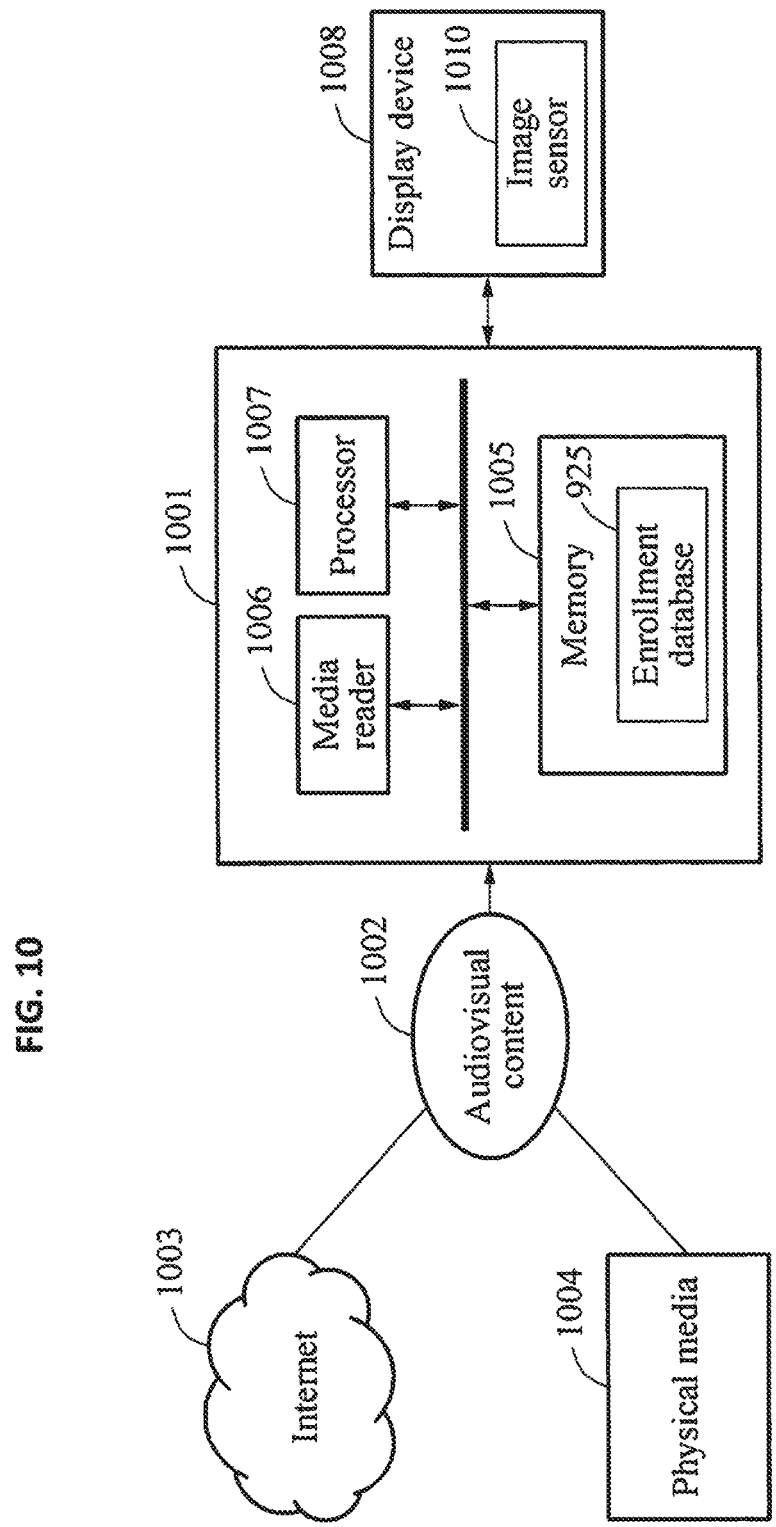
FIG. 10 illustrates an adaptive updating apparatus of an enrollment database in a system for setting audiovisual content according to at least one example embodiment.

FIG. 10 illustrates an adaptive updating apparatus of an enrollment database in a system for setting audiovisual content according to at least one example embodiment.

As shown in FIG. 10, a receiver 1001 receives audiovisual content 1002. The audiovisual content 1002 may be stored on a server linked to the receiver via a network 103 (e.g., Internet). The receiver comprises a memory 1005. This memory 1005 is able to store the received audiovisual content 1002. The audiovisual content 1002 may be also stored on a physical media 1004 (e.g., Blu-ray disc). The receiver 1001 includes a processor 1007 which is configured, upon receiving of an adequate set of instructions stored on the memory 1005, to decode the audiovisual content 1002 before rendering it. Optionally, the receiver 1001 comprises a media reader 1006 adapted to read the audiovisual content 1002 stored on the physical media 1004 (e.g., Blu-Ray reader). The memory 1005 also stores the enrollment database 925 including the pre-enrolled enrollment images. The system comprises means for rendering the audiovisual content 1002, for example, a display device 1008. The display device 1008 includes an image sensor 1010. The image sensor 1010 obtains an image of a user using the display device 1008. Moreover, the processor 1007, enrollment database 925 and the image sensor 1010 may form the adaptive updating apparatus. The processor 1007 performs the functions of the adaptive updating apparatus and those described with reference to FIGS. 1-8 by executing computer-readable instructions stored in the memory 1005.

The audiovisual content 1002 contains frames associated with a watching level. A watching level is an indication indicating how offensive a part of the audiovisual content 1002 such as a violence level. The watching level may be based on the images of the audiovisual content 1002, on the audio part, on the text of subtitles, or any combination of them. The watching level may for example take the form of a couple of, on one side, the category of the offensive content (for example violence, sex, horror), and on another side, a value associated to this category (this may be for example a value comprised between 1 and 10: the greater this value is, the more offensive according to the chosen category the associated content is).

The audiovisual content 1002 may contain audiovisual segments and/or frames respectively associated with watching levels; both frames and segments are supposed to be representative of a degree of offensiveness of part or whole of the audiovisual content 1002. The watching level may be a part of the metadata of the audiovisual content 1002. It may also be manually annotated very early in the process of producing the audiovisual content 1002. The segments or the frames may be also associated with watching levels in an automated manner. If the watching level corresponds to a violence scale for example, then audiovisual segments and/or frames related to violent scenes, and/or frames will be detected and graded according to the violence scale. Methods and techniques allowing such detections are known and can be found for example in Gong et al., Detecting Violent Scenes in Movies by Auditory and Visual Cues, 9th Pacific Rim Conference on Multimedia, NatlCheng Kung Univ. Tainan TAIWAN, Dec. 9-13, 2008, pp. 317-326, the entire contents of which are hereby incorporated by reference.

Once the audiovisual content 1002 is received by the receiver 1001, the processor 1007 executes instructions stored on the memory 1005. Once the processor 1007 has analyzed the audiovisual content 1002, at least two frames, each being respectively associated with a watching level, are permitted to be displayed on the display device 1008. The processor 1007 then chooses which frame to display that corresponds to an authenticated user using the display device 1008. The user is authenticated by the adaptive updating apparatus, as described with respect to FIGS. 1-8.

More specifically, the memory 1005 stores desired watching levels associated with authenticated users. The processor 1007 selects a frame such that the watching level associated with the selected frame does not exceed the desired watching levels associated with the authenticated user using the display device 1008.

Figure 11:
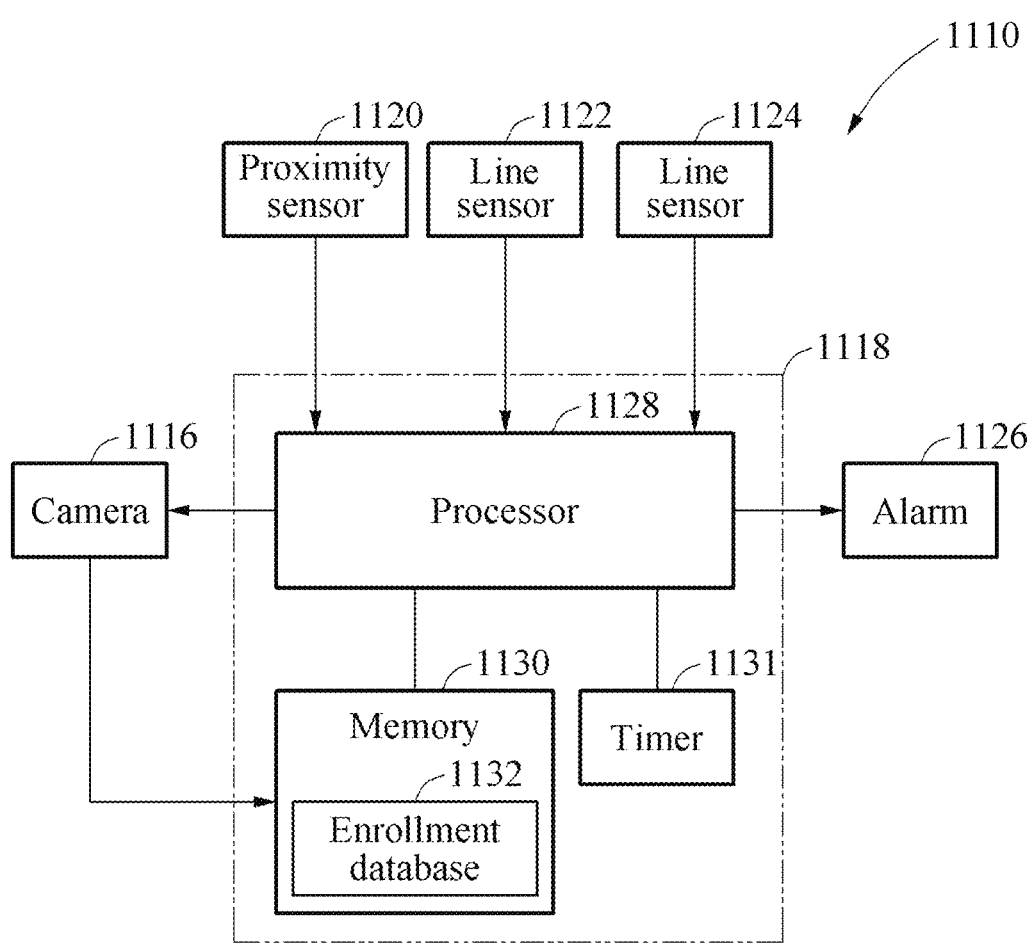
FIG. 11 illustrates an adaptive updating apparatus of an enrollment database in a system for enforcing parking according to at least one example embodiment.

FIG. 11 illustrates an adaptive updating apparatus of an enrollment database in a system for enforcing parking according to at least one example embodiment.

As shown in FIG. 11, a system for parking spot enforcement 1110 uses the adaptive updating apparatus (e.g., a processor 1128, a camera 1116 and a memory 1130) and a proximity sensor 1120 (e.g., one or more ultrasonic sensors) for detecting entry of a vehicle within a parking space or a parking spot designated for use by disabled people or a reserved parking spot and for authenticating a driver or passenger of the vehicle. The processor 1128 performs the functions of the adaptive updating apparatus and those described with reference to FIGS. 1-8 by executing computer-readable instructions stored in the memory 1130.

An alarm 1126 is also positioned adjacent the parking spot, and the alarm 1126 is actuated for a pre-set period of time, such as 30 seconds, for example, if the driver and/or passenger is not authenticated. The alarm 1126 can be any suitable type of alarm, such as an audio alarm, such as generating an alert by a speaker, or a visual alarm, such as generating a visual alert by a light source, or a combination thereof. A camera 1116 is also positioned adjacent the parking spot for capturing a photographic image of the driver and/or passenger.

It should be understood that any of various suitable types of cameras can be utilized and/or various types of visual sensors or image sensors can also be utilized in this regard, for example. The alarm 1126, the camera 1116, the proximity sensor 1120, and line sensors 1122, 1124 (to be described below) are each in electrical communication with a controller 1118.

The picture taken by the camera 1116 is used by the processor 1128 and the memory 1130 to authenticate the driver and/or passenger as described above with reference to FIGS. 1-8. Additionally, the line sensors 1122, 1124 are provided for detecting if the vehicle is properly parked within the designated boundaries of the parking space or parking. If the vehicle is parked over one of the line markings (i.e., partially parked in an adjacent space), then the alarm 1126 can be actuated, for example.

It should be understood that the proximity sensor 1120 and the line sensors 1122, 1124 can be any of various suitable types of sensors for detecting the presence of the vehicle.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, example embodiments of the adaptive updating apparatus of an enrollment database may be implemented in capturing and authorizing a face of a passenger when boarding a bus using a traffic card may be additionally considered as an additional example. Moreover, example embodiments of the adaptive updating apparatus of an enrollment database may be implemented in authorizing a user for mobile banking and authorizing permitted entrants in a door locking system.

For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of adaptively updating an enrollment database, the method comprising:
   authenticating an input image;
   determining whether the input image is an outlier;
   determining whether a feature range of the enrollment database is increased when a feature vector extracted from the input image is enrolled in the enrollment database; and
   replacing one of enrollment images in the enrollment database with the input image based on a result of the determining whether the input image is the outlier and the determining whether the feature range of the enrollment database is increased.

2. The method of claim 1, wherein the determining whether the input image is an outlier comprises:
   determining whether the input image is the outlier based on at least one of distances between a first feature vector and respective ones of second feature vectors, the first feature vector extracted from the input image and the second feature vectors extracted from the enrollment images in the enrollment database.

3. The method of claim 1, wherein the determining whether the input image is an outlier comprises:
   calculating a representative distance based on a first feature vector and second feature vectors, the first feature vector extracted from the input image and the second feature vectors extracted from the enrollment images in the enrollment database; and
   determining whether a condition associated with the representative distance are satisfied.

4. The method of claim 3, wherein the condition is whether the representative distance is less than a threshold.

5. The method of claim 1, wherein the determining whether a feature range of the enrollment database is increased when a feature vector extracted from the input image is enrolled in the enrollment database comprises:
   calculating an accumulation feature distance corresponding to each vector in a vector set, the vector set including a first feature vector and second feature vectors, the first feature vector extracted from the input image and the second feature vectors extracted from the enrollment images in the enrollment database; and
   determining whether the accumulation feature distance corresponding to the first feature vector is greater than at least one of accumulation feature distances corresponding to respective ones of the second feature vectors.

6. The method of claim 5, wherein the calculating an accumulation feature distance corresponding to each vector comprises:
adding distances between a specific vector corresponding to the accumulation feature distance and remaining vectors in the vector set.

7. The method of claim 5, wherein the replacing one of enrollment images in the enrollment database with the input image comprises:
replacing one of the enrollment images with the input image if the accumulation feature distance corresponding to the first feature vector is greater than the at least one of the accumulation feature distances corresponding to respective ones of the second feature vectors.

8. The method of claim 5, wherein the replacing one of the enrollment images replaces the enrollment image corresponding to one of the second feature vectors that has a minimum accumulation feature distance among the accumulation feature distances.

9. The method of claim 1, wherein the replacing one of enrollment images in the enrollment database with the input image comprises:
replacing one of the enrollment images in the enrollment database with the input image based on the determining that the input image is not the outlier and the determining that the feature range of the enrollment database is increased.

10. The method of claim 1, wherein the replacing one of enrollment images comprises:
adding the input image in the enrollment database based on a number of the enrollment images enrolled in the enrollment database and a maximum enrollment number of the enrollment database.

11. The method of claim 1, wherein the replacing one of enrollment images comprises:
adding the input image to the enrollment database if a number of the enrollment images enrolled in the enrollment database is less than a maximum enrollment number of the enrollment database; and
replacing one of the enrollment images enrolled in the enrollment database with the input image if the number of the enrollment images is equal to the maximum enrollment number.

12. The method of claim 1, wherein the authenticating an input image comprises:
authenticating the input image as a user based on a first feature vector and second feature vectors, the first feature vector extracted from the input image and the second feature vectors extracted from the enrollment images in the enrollment database.

13. The method of claim 1, where the determining whether a feature range of the enrollment database is increased when a feature vector extracted from the input image is enrolled in the enrollment database comprises:
determining, in response to determining the input image is not the outlier, whether the feature range of the enrollment database is increased when the feature vector extracted from the input image is enrolled in the enrollment database.

14. A non-transitory computer-readable medium comprising program code that, when executed by a processor, causes the processor to perform
authenticating an input image;
determining whether the input image is an outlier;
determining whether a feature range of an enrollment database is increased when a feature vector extracted from the input image is enrolled in the enrollment database; and
replacing one of enrollment images in the enrollment database with the input image based on the determining whether the input image is the outlier and the determining whether the feature range of the enrollment database is increased.

15. An adaptive updating apparatus of an enrollment database, the adaptive updating apparatus comprising:
a memory storing computer-readable instructions; and
one or more processors configured to execute the computer-readable instructions such that the one or more processors is configured to cause the adaptive updating apparatus to,
authenticate an input image based on the enrollment database,
determine whether the input image is an outlier,
determine, in response to determining the input image is not the outlier, whether a feature range of the enrollment database is increased when a feature vector extracted from the input image is enrolled in the enrollment database, and
replace one of enrollment images in the enrollment database with the input image based on a result of the determining whether the feature range of the enrollment database is increased.

* * * * *